(12) United States Patent
Vanbrabant (10) Patent No.: US 8,083,039 B2
(45) Date of Patent: Dec. 27, 2011

(54) DISC SPRING INTAKE

(75) Inventor: Ronny Vanbrabant, Heusden-Zolder (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 959 days.

(21) Appl. No.: 11/897,201

(22) Filed: Aug. 29, 2007

(65) Prior Publication Data

US 2009/0057079 A1    Mar. 5, 2009

(51) Int. Cl.
F16F 9/34    (2006.01)

(52) U.S. Cl. .............. 188/322.15; 188/322.14

(58) Field of Classification Search ............. 188/282.5, 188/282.6, 322.13, 322.15, 322.14; 251/337
See application file for complete search history.

(56) References Cited

U.S. PATENT DOCUMENTS

| | | | |
|---|---|---|---|
| 4,809,828 A * | 3/1989 | Nakazato | 188/282.6 |
| 4,993,524 A * | 2/1991 | Grundei et al. | 188/282.6 |
| 5,123,671 A | 6/1992 | Driessen et al. | |
| 5,234,085 A | 8/1993 | Schneider | |
| 5,316,113 A * | 5/1994 | Yamaoka | 188/282.6 |
| 5,738,190 A | 4/1998 | Deferme | |
| 6,079,440 A * | 6/2000 | Fenn et al. | 137/493.9 |
| 6,089,142 A | 7/2000 | Adrian et al. | |
| 6,260,678 B1 | 7/2001 | Moradmand et al. | |
| 6,264,015 B1 | 7/2001 | De Kock | |
| 6,340,081 B1 * | 1/2002 | Keil | 188/322.15 |
| 6,371,264 B1 | 4/2002 | Deferme | |
| 6,382,372 B1 * | 5/2002 | Keil et al. | 188/322.15 |
| 6,460,664 B1 | 10/2002 | Steed et al. | |
| 6,634,379 B2 | 10/2003 | Asadi et al. | |
| 6,899,207 B2 | 5/2005 | Deferme et al. | |
| 7,070,029 B2 | 7/2006 | Deferme | |
| 2001/0009214 A1 | 7/2001 | Tanaka | |
| 2002/0096408 A1 * | 7/2002 | Moradmand et al. | 188/322.15 |
| 2003/0094342 A1 * | 5/2003 | Dodge et al. | 188/322.13 |
| 2005/0115786 A1 * | 6/2005 | Forster | 188/322.15 |

FOREIGN PATENT DOCUMENTS

| | | |
|---|---|---|
| JP | 6-185562 | 7/1994 |
| JP | 07-027164 | 1/1995 |
| KR | 1998-054296 | 7/1998 |

OTHER PUBLICATIONS

International Search Report from corresponding PCT Application No. PCT/US2008/009611 dated Feb. 26, 2009.
Written Opinion from corresponding PCT Application No. PCT/US2008/009611 dated Feb. 26, 2009.

* cited by examiner

*Primary Examiner* — Robert Siconolfi
*Assistant Examiner* — Anna Momper
(74) *Attorney, Agent, or Firm* — Harness, Dickey & Pierce, PLC (57) ABSTRACT

A disc valve assembly for a shock absorber opens due to axial movement of a valve disc. The valve disc is biased against a valve body by a valve spring. The valve spring is designed to provide a circumferentially asymmetrical load biasing the valve disc against the valve body. The disc valve assembly can be used as a piston rebound valve assembly, a piston compression valve assembly, a base valve compression valve assembly or a base valve rebound valve assembly.

20 Claims, 5 Drawing Sheets

DISC SPRING INTAKE

FIELD

The present disclosure relates to automotive shock absorbers. More particularly, the present disclosure relates to valve assemblies which control the fluid flow characteristics for the shock absorber.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

SUMMARY

The present disclosure is directed to a shock absorber which includes full displacement design valving for the check valve assemblies of the shock absorber. The check valve assemblies are designed to provide sufficient fluid flow while still maintaining the durability required for the shock absorber assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
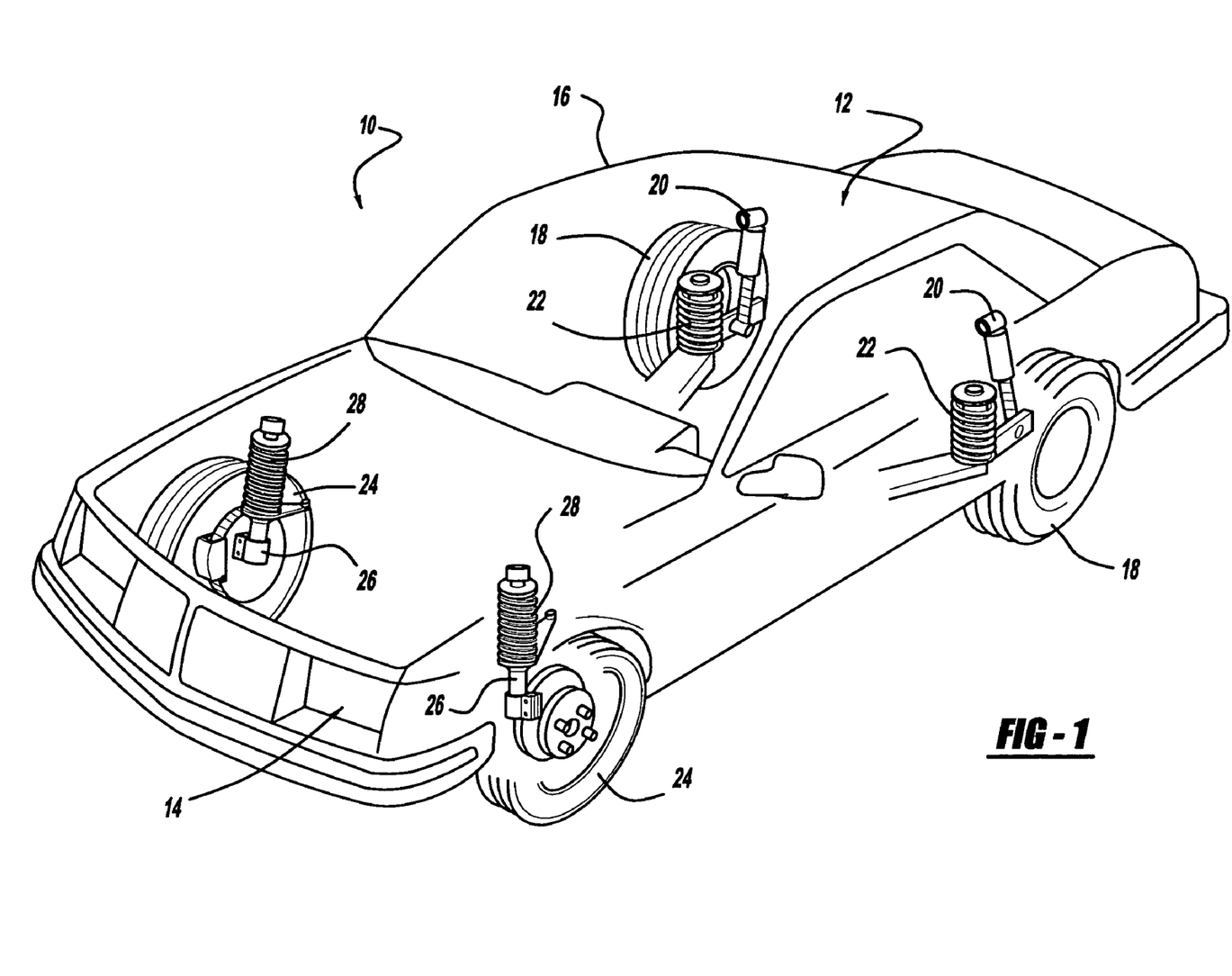
FIG. 1 is a schematic representation of a typical automobile which incorporates the unique base valve assembly in accordance with the present disclosure.

Referring now to the drawings in which like reference numerals designate like or corresponding parts throughout the several views, there is shown in FIG. 1 a vehicle which includes a suspension system incorporating shock absorbers in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
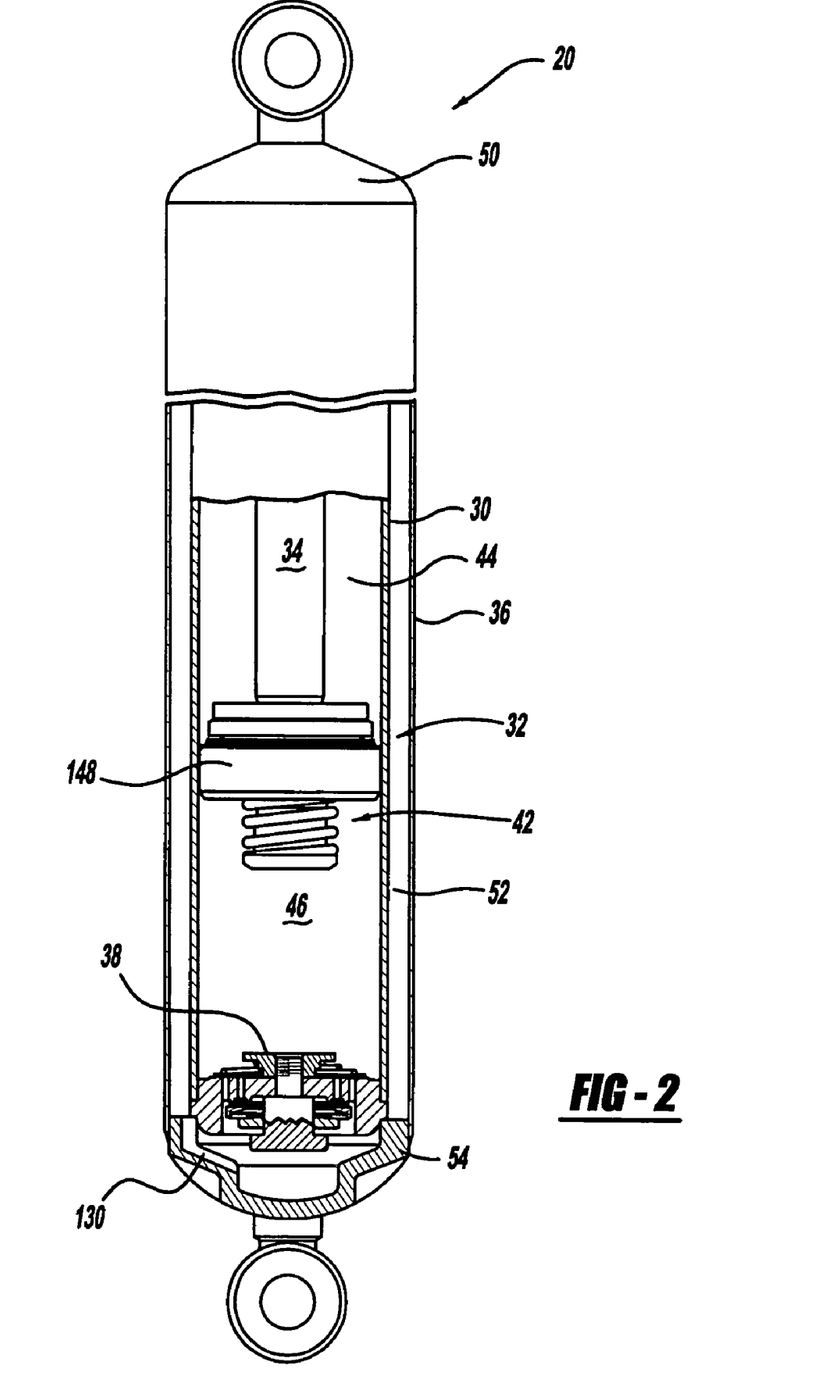
FIG. 2 is a side sectional view of the shock absorber in accordance with the present disclosure.

Referring now to FIG. 2, shock absorber 20 is shown in greater detail. While FIG. 2 illustrates only shock absorber 20, it is to be understood that shock absorber 26 also includes the valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 26 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 26 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
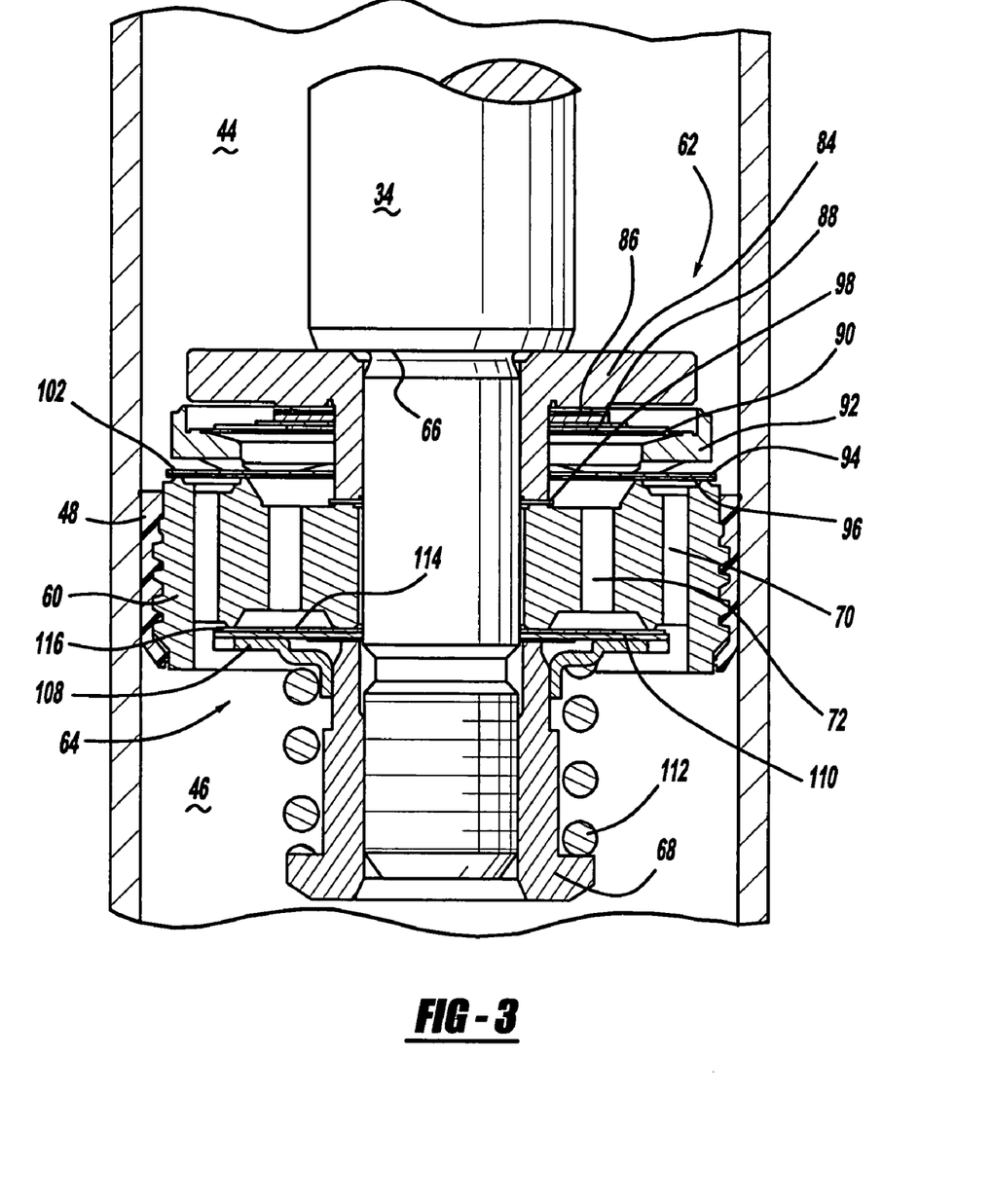
FIG. 3 is an enlarged cross-sectional view of the piston assembly in accordance with the present disclosure.

Referring now to FIG. 3, piston assembly 32 comprises a valve body 60, a compression check valve assembly 62 and a rebound valve assembly 64. Compression check valve assembly 62 is assembled against a shoulder 66 on piston rod 34. Valve body 60 is assembled against compression check valve assembly 62 and rebound valve assembly 64 is assembled against valve body 60. A nut 68 secures these components to piston rod 34. Valve body 60 defines a plurality of compression passages 70 and a plurality of rebound passages 72.

Figure 5:
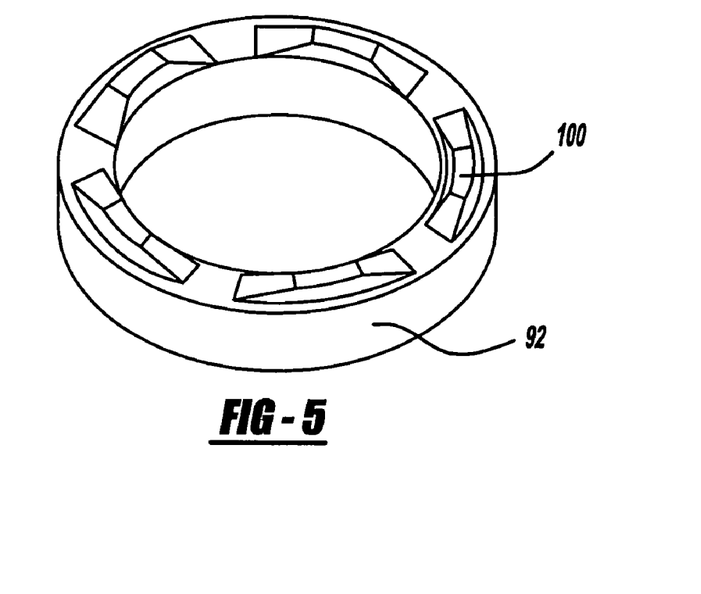
FIG. 5 is a perspective view of the interface for the valve assembly illustrated in FIGS. 2-4.

Compression check valve assembly 62 comprises a support washer 84, a bending preload disc 86, one or more valve discs 88, an interface disc 90, an interface 92, an intake valve disc 94 and an optional orifice disc 96. Support washer 84 is threadingly or slidingly received on piston rod 34 and is disposed between valve body 60 and shoulder 66. Nut 68 retains valve body 60 and compression check valve assembly 62 while permitting the tightening of nut 68 without compressing bending preload disc 86, valve discs 88, interface disc 90, interface 92, intake valve disc 94 or orifice disc 96. Support washer 84 is positioned against shoulder 66 and the specified amount of preload is set for valve discs 88 and interface disc 90 by one or more shims 98 disposed between support washer 84 and valve body 60. Interface 92, intake valve disc 94 and orifice disc 96 are free to move axially with respect to support washer 84 and piston rod 34 to open and close compression passages 70 while leaving rebound passages 72 open. Fluid flow to rebound passages 72 is provided by the design of interface disc 90 and/or the design of interface 92 which includes a plurality of projections 100 as illustrated in FIG. 5. The axial movement of these components eliminates the need for these components to bend to open compression passages 70 and thus provides a full displacement valve disc for the valve assembly. Orifice disc 96 includes at least one slot 102 which permits a limited amount of bleed flow bypassing compression check valve assembly 62. While compression check valve assembly 62 is illustrated including orifice disc 96, it is within the scope of the present invention to eliminate orifice disc 96 and have no bleed flow; to eliminate orifice disc 96 and to provide the sealing land on valve body 60 with the at least one slot 102; or to eliminate orifice disc 96 and provide the bleed flow in rebound valve assembly 64 as discussed below. During a compression stroke, fluid in lower working chamber 46 is pressurized causing fluid pressure to react against intake valve disc 94 and orifice disc 96. When the fluid pressure against intake valve disc 94 and orifice disc 96 overcomes the biasing load of interface disc 90, intake valve disc 94, orifice disc 96 and interface 92 will move axially with respect to support washer 84 to open compression passages 70 and allow fluid flow from lower working chamber 46 to upper working chamber 44. During a rebound stroke, compression passages 70 are closed by intake valve disc 94 and orifice disc 96.

Rebound valve assembly 64 comprises an interface 108, a plurality of valve discs 110 and a spring 112. Valve discs 110 abut valve body 60 and close rebound passages 72 while leaving compression passages 70 open. Spring 112 is disposed between interface 108 and nut 68 to bias valve discs 110 against valve body 60. As illustrated, the plurality of valve discs 110 includes a bleed valve disc 114 which abuts valve body 60. Bleed valve disc 114 includes one or more bleed slots 116 which permit a limited amount of bleed flow bypassing rebound valve assembly 64. While rebound valve assembly 64 is illustrated including bleed valve disc 114, it is within the scope of the present invention to eliminate bleed valve disc 114 and have no bleed flow; to eliminate bleed valve disc 114 and to provide the sealing land on valve body 60 with the one or more slots 116; or to eliminate bleed valve disc 114 and provide the bleed flow in compression check valve assembly 62 as discussed above. Either or both of orifice disc 96 and bleed valve disc 114 will be used if bleed flow is to be provided. During a rebound stroke, fluid in upper working chamber 44 is pressurized causing fluid pressure to react against valve discs 110. When the fluid pressure against valve discs 110 overcomes the bending load of valve discs 110 and the biasing load of spring 112, valve discs 110 separate from valve body 60 to open rebound passages 72 and allow fluid flow from upper working chamber 44 to lower working chamber 46. During a compression stroke, rebound passages 72 are closed by valve discs 110.

Figure 6A:
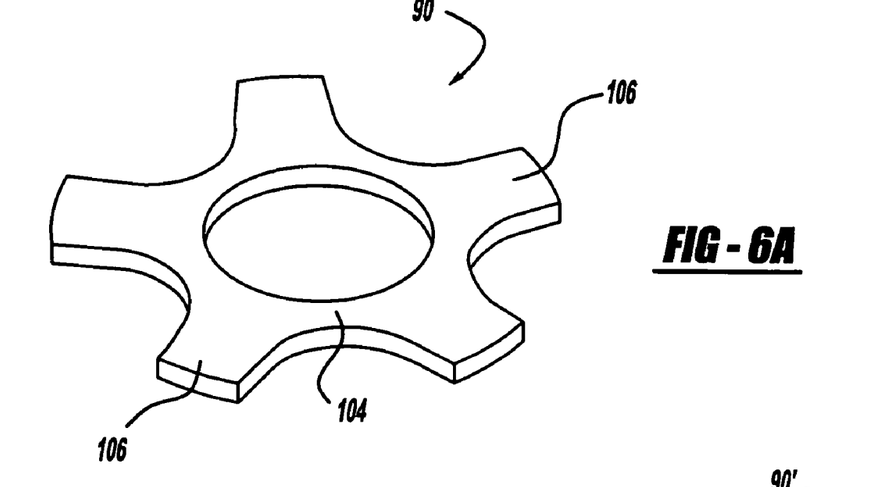
FIGS. 6A-6C are perspective views of various embodiments of the interface disc illustrated in FIGS. 2-4.

As illustrated in FIG. 5, interface 92 includes the plurality of projections 100 that are designed to interface with intake valve disc 94. The plurality of projections provide a uniform application of the biasing load to intake valve disc 94 as well as allowing fluid flow between interface 92 and intake valve disc 94 to reach rebound passages 72. FIG. 6A illustrates interface disc 90 which includes an annular center portion 104 and a plurality of legs 106. The number and the width of legs 106 can be selected to provide the specified damping characteristics for shock absorber 20. As illustrated in FIG. 6A, the plurality of legs 106 are all the same width and are located symmetrically around center portion 104. Fluid flow is thus provided between legs 106 to reach compression passages 70.

Figure 6B:
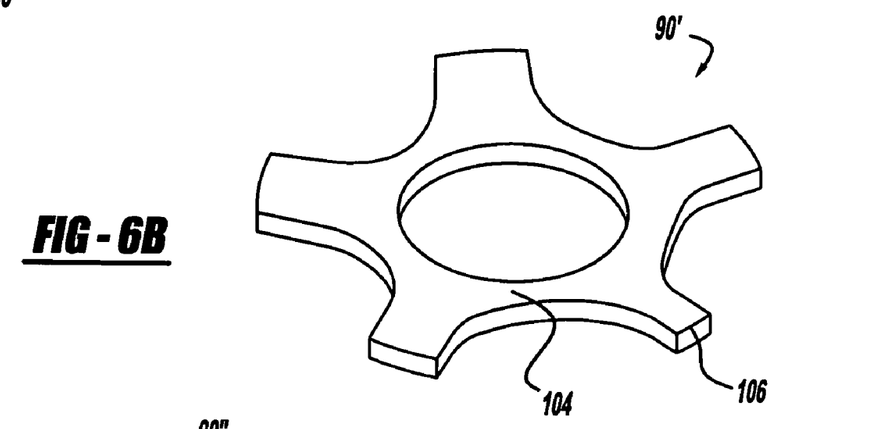
Figure 6C:
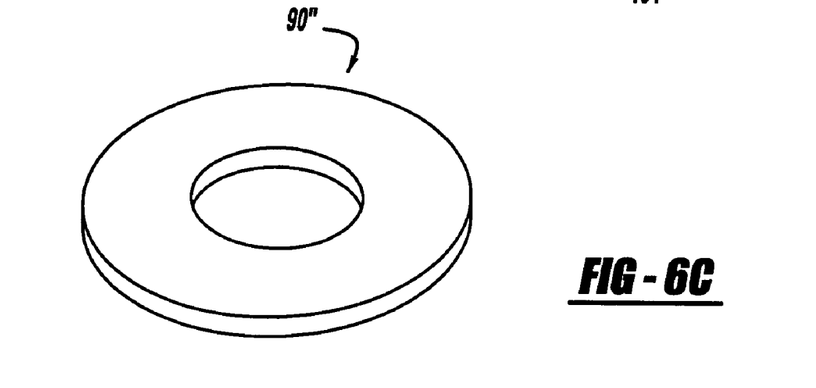

FIG. 6B illustrates an interface disc 90' where the plurality of legs 106 are not the same width and are not symmetrically located around center portion 104 thus creating an asymmetric design. This asymmetric design can be utilized to tune the damping curve for shock absorber 20. FIG. 6C illustrates an interface disc 90" as an annular full disc without legs 106.

Figure 4:
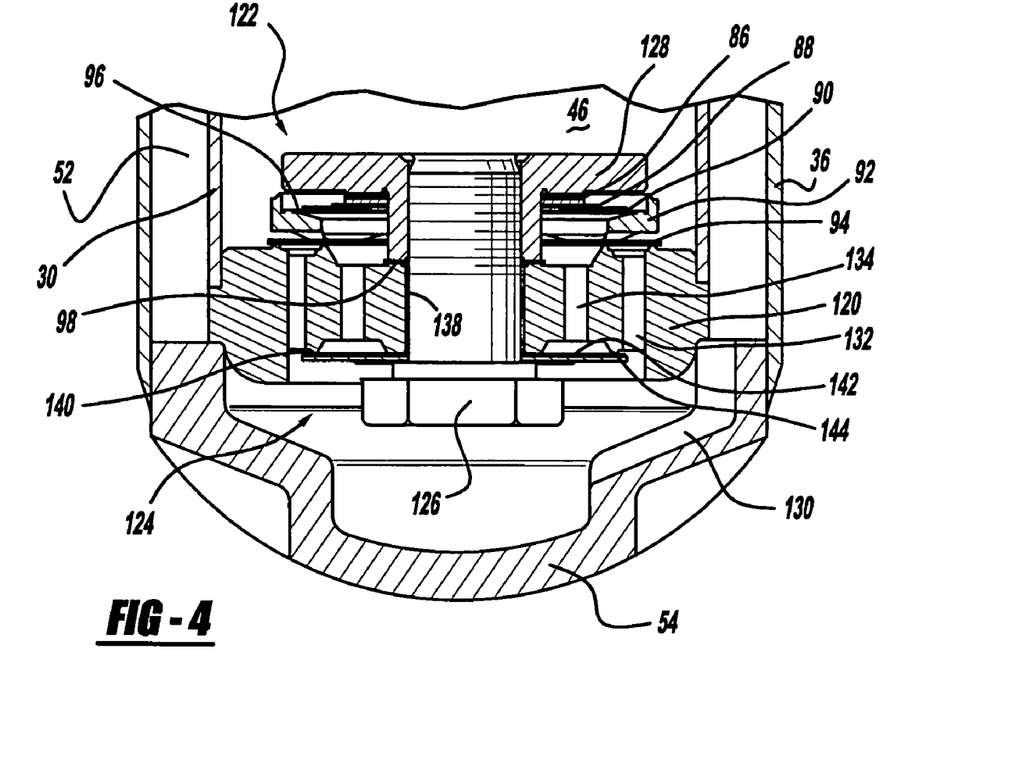
FIG. 4 is an enlarged cross-sectional view of the base valve assembly in accordance with the present disclosure.

Referring now to FIG. 4, base valve assembly 38 comprises a valve body 120, an intake or rebound check valve assembly 122, a compression valve assembly 124, a retaining bolt 126 and a retaining nut 128. Valve body 120 is secured to pressure tube 30 and end cap 54 by press fitting or by other methods known well in the art. End cap 54 is secured to reservoir tube 36 and it defines a plurality of fluid passages 130 which allow communication between reservoir chamber 52 and base valve assembly 38. Valve body 120 defines a plurality of intake or rebound fluid passages 132, a plurality of compression fluid passages 134, and a central bore 138. Retaining bolt 126 extends through central bore 138 and threadingly engages retaining nut 128 to secure both rebound check valve assembly 122 and compression valve assembly 124 to valve body 120. While FIG. 4 illustrates retaining bolt 126 and retaining nut 128 other retainers including but not limited to a valve pin can be utilized.

Rebound check valve assembly 122 comprises retaining nut 128, bending preload disc 86, the plurality of valve discs 88, interface disc 90, interface 92, intake valve disc 94 and orifice disc 96. Retaining bolt 126 retains valve body 120 and rebound check valve assembly 122 while permitting the tightening of retaining nut 128 without compressing bending preload disc 86, valve discs 88, interface disc 90, interface 92, intake valve disc 94 or orifice disc 96. The specified amount of preload is provided for valve discs 88 and interface disc 90 using one or more shims 98 disposed between retaining nut 128 and valve body 120. Interface 92, intake valve disc 94 and orifice disc 96 are free to move axially with respect to retaining nut 128 to open and close rebound passages 132 while leaving compression fluid passages 134 open. Fluid flow to compression fluid passages 134 is provided by the design of interface disc 90 and/or the design of interface 92 which includes the plurality of projections 100 as illustrated in FIG. 5. The axial movement of these components eliminates the need for these components to bend to open rebound passages 132 and thus provides a full displacement valve disc for the valve assembly. Orifice disc 96 includes the at least one slot 102 which permits a limited amount of bleed flow bypassing rebound check valve assembly 122. While rebound check valve assembly 122 is illustrated including orifice disc 96, it is within the scope of the present invention to eliminate orifice disc 96 and have no bleed flow; to eliminate orifice disc 96 and to provide the sealing land on valve body 120 with the at least one slot 102; or to eliminate orifice disc 96 and provide the bleed in compression valve assembly 124 as discussed below.

Compression valve assembly 124 comprises a plurality of valve discs 140 and retaining bolt 126. Valve discs 140 are biased against the lower surface of valve body 120 by retaining bolt 126 and retaining nut 128. Valve discs 140 close the plurality of compression fluid passages 134 while leaving rebound passages 132 open. As illustrated, the plurality of valve discs 140 includes a bleed valve disc 142 which abuts valve body 120. Bleed valve disc 142 includes one or more bleed slots 144 which permits a limited amount of bleed flow bypassing compression valve assembly 124. While compression valve assembly 124 is illustrated including bleed valve disc 142, it is within the scope of the present invention to eliminate bleed valve disc 142 and have no bleed flow; to eliminate bleed valve disc 142 and to provide the sealing land on valve body 120 with the one or more bleed slots 144; or to eliminate bleed valve disc 142 and provide the bleed flow in rebound check valve assembly 122 as discussed above. Either or both of orifice disc 96 and bleed valve disc 142 will be used if bleed flow is to be provided. During a compression stroke of shock absorber 20, fluid pressure increases in lower working chamber 46 until the fluid pressure within compression fluid passages 134 is capable of overcoming the bending force of valve discs 140. When the bending force of valve discs 140 is exceeded by fluid pressure acting against valve discs 140, valve disc 140 will deflect away from valve body 120 to allow fluid flow to reservoir chamber 52 from lower working chamber 46.

As illustrated in FIG. 5, interface 92 includes the plurality of projections 100 that are designed to interface with intake valve disc 94. The plurality of projections provide a uniform application of the biasing load to intake valve disc 94 as well as allowing fluid flow between interface 92 and intake valve disc 94 to reach rebound fluid passages 132.

During a compression stroke, fluid in lower working chamber 46 is pressurized causing fluid pressure to react against orifice disc 96 and intake valve disc 94 of compression check valve assembly 62. When the fluid pressure acting against orifice disc 96 and intake valve disc 94 overcomes the biasing load produced by valve discs 88 and interface disc 90 of compression check valve assembly 62, valve discs 88 and interface 90 will deflect allowing axial movement of interface 92, intake valve disc 94 and orifice disc 96 of compression check valve assembly 62 opening compression passages 70 allowing fluid flow from lower working chamber 46 to upper working chamber 44. The strength of valve discs 88 and interface disc 90 and the size of compression passages 70 are designed to apply a specified amount of load such that compression check valve assembly 62 quickly opens to allow fluid flow but compression check valve assembly 62 also contributes to the damping characteristics of shock absorber 20.

Due to the rod flow concept, fluid pressure in lower working chamber 46 will also react through compression fluid passages 134 against valve discs 140. When the bending load of valve discs 140 is exceeded by the fluid pressure, valve discs 140 will deflect away from valve body 120 to allow fluid flow from lower working chamber 46 to reservoir chamber 52. The design of valve discs 140 and the size of compression fluid passages 134 will determine the damping characteristics for shock absorber 20 during a compression stroke. Prior to the deflection of valve discs 140, a controlled amount of fluid flow, bleed flow, will flow from lower working chamber 46 to reservoir chamber 52 through slot 102 in rebound check valve assembly 122 and/or bleed slots 144 in bleed valve disc 142 in compression valve assembly 124 if they are provided.

During a rebound stroke, fluid in upper working chamber 44 is pressurized causing fluid pressure to react through rebound fluid passages 72 against valve discs 110. When the bending load of valve discs 110 and the biasing load of spring 112 are exceeded by the fluid pressure, valve discs 140 will deflect away from valve body 60 to allow fluid flow from upper working chamber 44 to lower working chamber 46. The design of valve discs 110, spring 112 and the size of rebound fluid passages 72 will determine the damping characteristics for shock absorber 20 during a rebound stroke. Prior to the deflection of valve discs 110, a controlled amount of fluid flow, bleed flow, will flow from upper working chamber 44 to lower working chamber 46 through slot 102 in compression check valve assembly 62 and/or bleed slot 116 in bleed valve disc 114 in rebound valve assembly 64 if they are provided.

Due to the rod volume concept, an additional amount of fluid needs to flow into lower working chamber 46 is needed and this fluid will flow from reservoir chamber 52. The increase in pressure in upper working chamber 44 will cause a decrease in fluid in lower working chamber 46 such that the fluid pressure in reservoir chamber 52 will exceed the fluid pressure in lower working chamber 46. This fluid pressure will react against orifice disc 96 and intake valve disc 94 of rebound check valve assembly 122. When the fluid pressure acting against orifice disc 96 and intake valve disc 94 overcomes the biasing load produced by valve discs 88 and interface disc 90 of rebound check valve assembly 122, valve discs 88 and interface 90 will deflect allowing axial movement of interface 92, intake valve disc 94 and orifice disc 96 of rebound check valve assembly 122 opening rebound passages 132 allowing fluid flow from reservoir chamber 52 to lower working chamber 46. The strength of valve discs 88 and interface disc 90 and the size of rebound fluid passages 132 are designed to apply a specified amount of load such that rebound check valve assembly 122 quickly opens to allow fluid flow but rebound check valve assembly 122 also contributes to the damping characteristics of shock absorber 20.

What is claimed is:

1. A shock absorber comprising:
a pressure tube forming a working chamber;
a piston body disposed within said working chamber formed by said pressure tube, said piston body dividing said pressure tube into an upper working chamber and a lower working chamber, said piston body defining a first plurality of compression passages, a first plurality of rebound passages, a first outer land encircling both said first plurality of compression passages and said first plurality of rebound passages, and a first inner land encircling said first plurality of rebound passages and not said first plurality of compression passages;
a piston rod attached to said piston body, said piston body defining a central axis extending through one end of said pressure tube;
a compression valve assembly engaging said piston body, said compression valve assembly comprising:
a first valve disc disposed around said piston rod, said first valve disc engaging said first inner and first outer lands of said piston body to close said first plurality of compression passages;
a first interface disposed around said piston rod, said first interface defining a plurality of circumferentially spaced planar surfaces engaging said first valve disc, a fluid flow path being defined between adjacent planar surfaces; and
a first biasing member disposed between said first interface and said piston rod, said first biasing member generating a load to urge said first interface and said first valve disc toward said piston body; wherein
said first valve disc and said first interface move parallel to the central axis to open said first plurality of compression passages;
an open gap is defined between said first interface and said piston rod, said open gap allowing said first interface to react to asymmetric loading by said first biasing member.

2. The shock absorber according to claim 1, wherein said first biasing member is a disc spring.

3. The shock absorber according to claim 2, wherein said disc spring comprises an annular center portion and a plurality of legs extending radially outward from said annular center portion.

4. The shock absorber according to claim 3, wherein said plurality of legs are located circumferentially asymmetric with respect to each other.

5. The shock absorber according to claim 3, wherein a width of one of said plurality of legs is different than a width of another one of said plurality of legs.

6. The shock absorber according to claim 5, wherein said plurality of legs are located circumferentially asymmetric with respect to each other.

7. The shock absorber according to claim 1, wherein the shock absorber further comprises a rebound valve assembly, said rebound valve assembly comprising:
a second valve disc engaging said piston body to close said first plurality of rebound passages;
a second interface engaging said second valve disc; and
a second biasing member disposed between said second interface and said piston rod, said second biasing member urging said second interface and said second valve disc toward said piston body.

8. The shock absorber according to claim 7, wherein said second biasing member is a compression spring.

9. The shock absorber according to claim 1, wherein the shock absorber further comprises a reserve tube surrounding said pressure tube to define a reserve chamber between said pressure tube and said reserve tube and a base valve assembly disposed between said working chamber and said reserve chamber, said base valve assembly comprising:
a base valve body;
a second valve disc engaging said base valve body;
a second interface engaging said second valve disc; and
a second biasing member disposed between said second interface and said base valve body, said second biasing member urging said second interface and said second valve disc toward said base valve body.

10. The shock absorber according to claim 9, wherein said second biasing member is a disc spring.

11. The shock absorber according to claim 10, wherein said disc spring comprises an annular center portion and a plurality of legs extending radially outward from said annular center portion.

12. The shock absorber according to claim 11, wherein a width of one of said plurality of legs is different than a width of another one of said plurality of legs.

13. The shock absorber according to claim 12, wherein said plurality of legs are located circumferentially asymmetric with respect to each other.

14. The shock absorber according to claim 11, wherein said plurality of legs are located circumferentially asymmetric with respect to each other.

15. The shock absorber according to claim 9, wherein said biasing member creates an asymmetric biasing load.

16. The shock absorber according to claim 9, wherein said base valve body defines a second plurality of compression passages, a second plurality of rebound passages, a second outer land encircling said second plurality of compression passages and said second plurality of rebound passages and a second inner land encircling said second plurality of compression passages and not said first plurality of said rebound passages, said second valve disc engaging said second inner and second outer lands of said base valve body to close said second plurality of rebound passages.

17. The shock absorber according to claim 1, wherein said biasing member creates an asymmetric biasing load.

18. A shock absorber comprising:
a pressure tube forming a working chamber;
a piston body disposed within said working chamber formed by said pressure tube, said piston body dividing said pressure tube into an upper working chamber and a lower working chamber, said piston body defining a compression passage and a rebound passage;

a piston rod attached to said piston body, said piston body defining a central axis extending through one end of said pressure tube;

a compression valve assembly engaging said piston body, said compression valve assembly comprising:

a first valve disc disposed around said piston rod, said first valve disc engaging said piston body to close said compression passage;

a first interface disposed around said piston rod, said first interface defining a plurality of circumferentially spaced planar surfaces directly engaging said first valve disc, a fluid flow path being defined between adjacent planar surfaces; and a first biasing member disposed between said first interface and said piston rod, deflection of said first biasing member generating an asymmetric load to bias said first interface toward said first valve disc and said first valve disc toward said piston body; wherein said first valve disc and said first interface move parallel to the central axis to open said compression passage;

an open gap is defined between said first interface and said piston rod, said open gap allowing said first interface to react to asymmetric loading by said first biasing member.

19. The shock absorber according to claim 18, wherein the shock absorber further comprises a rebound valve assembly, said rebound valve assembly comprising:

a second valve disc engaging said piston body to close said rebound passages;

a second interface engaging said second valve disc; and a second biasing member disposed between said second interface and said piston rod, said second biasing member urging said second interface and said second valve disc toward said piston body.

20. The shock absorber according to claim 18, wherein the shock absorber further comprises a reserve tube surrounding said pressure tube to define a reserve chamber between said pressure tube and said reserve tube and a base valve assembly disposed between said working chamber and said reserve chamber, said base valve assembly comprising:

a base valve body;

a second valve disc engaging said base valve body;

a second interface engaging said second valve disc; and a second biasing member disposed between said second interface and said base valve body, said second biasing member urging said second interface and said second valve disc toward said base valve body.

* * * * *